United States Patent Office 2,923,440
Patented Feb. 2, 1960

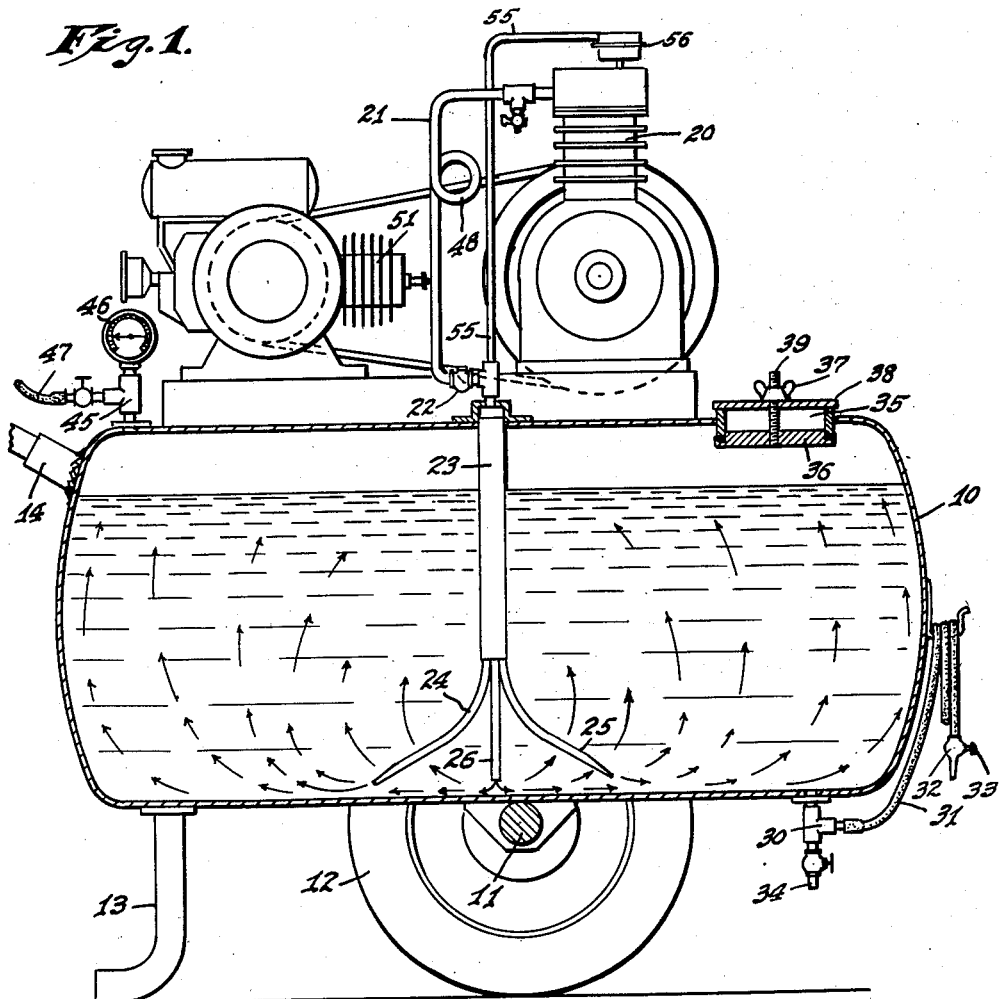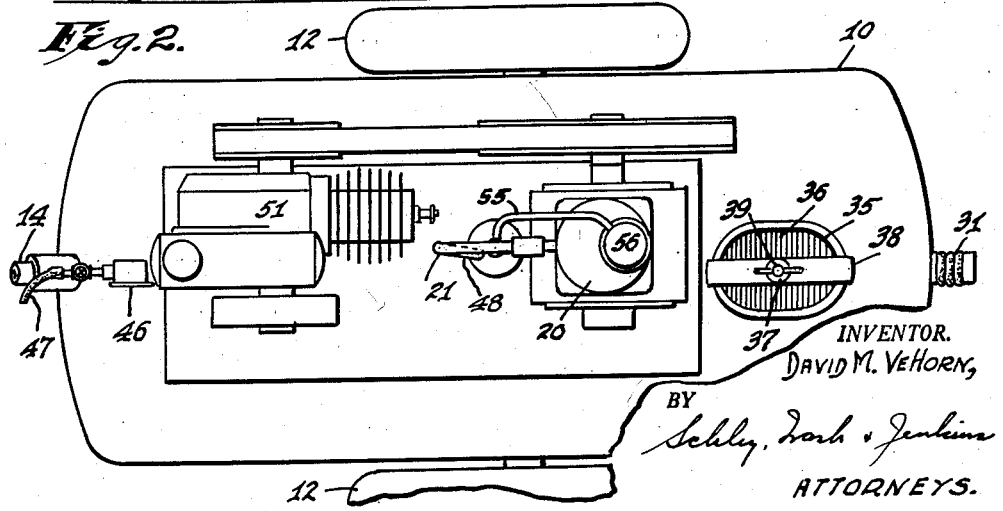

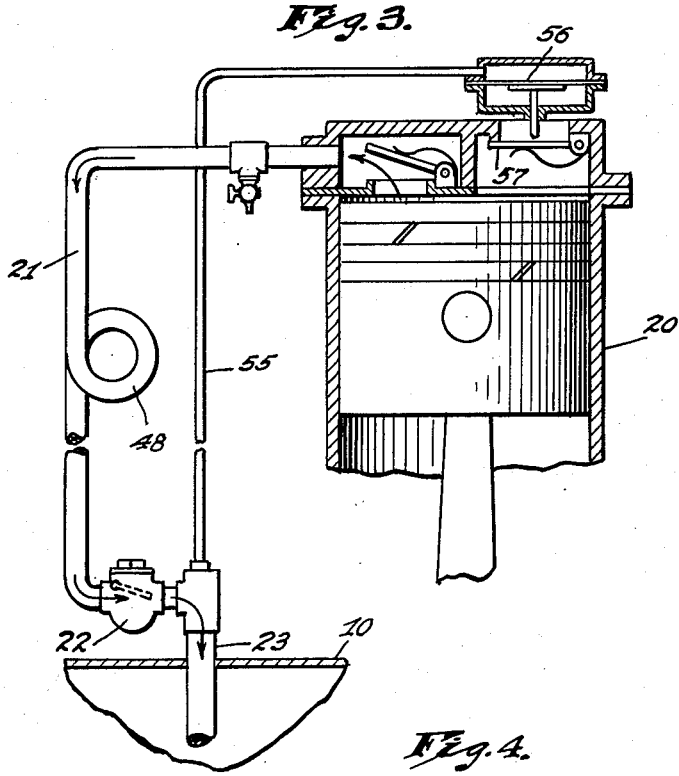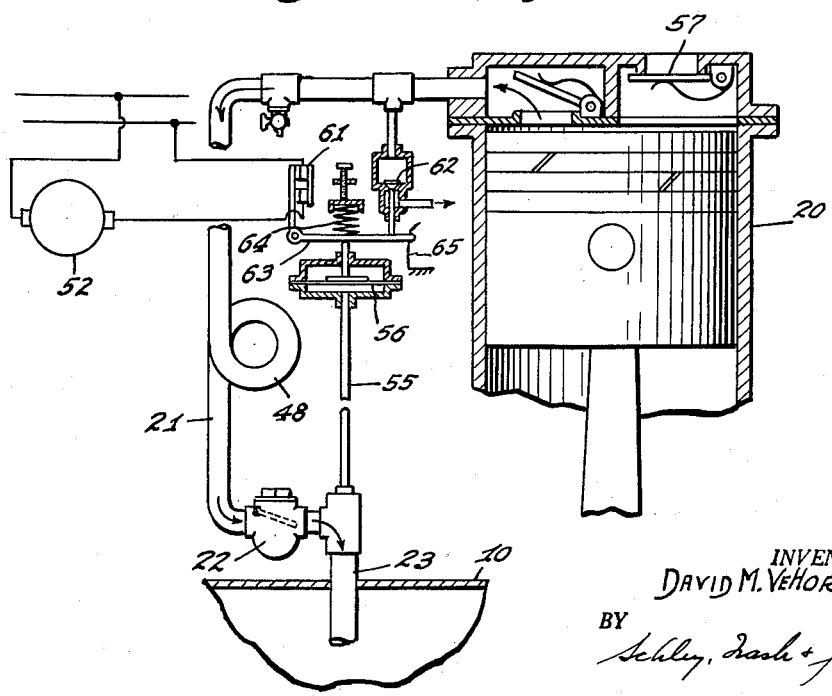

2,923,440
APPARATUS FOR AGITATING AND SPRAYING LIQUIDS

David M. Ve Horn, Indianapolis, Ind.

Application March 18, 1955, Serial No. 495,136

3 Claims. (Cl. 222—176)

It is the object of my invention to provide a simple and effective process and apparatus for agitating and spraying a liquid, and for mixing the liquid during such agitation with any co-present liquids or solids.

This process and apparatus are for stirring up and mixing many kinds of liquids, such as paints, disinfectants, and insecticides, especially those in which small amounts of liquid or solid concentrates are mixed into larger amounts of water or other diluent, whether such concentrates are additives to the liquid or are substances which have separated from the main liquid, and for then spraying to the desired place the substantially uniform liquid product produced by such agitation.

In carrying out my invention, in its preferred form, a suitable air-compressor forces air into a suitable agitation or mixing tank, in which the air is effectively distributed by distributing pipes to produce a thorough agitation and mixing of the tank contents both before and during the spraying operation, and builds pressure in the tank for that spraying after the desired initial agitation and mixing has been done. The tank is desirably mounted on wheels, for ready mobility; and desirably the air compressor and its operating motor are mounted on the tank to be moved with it. The air-distributing pipes are so arranged in the tank that the incoming air efficiently agitates the liquid and any co-present material, and circulates them throughout the tank and especially at and along the bottom thereof. When desired, substantially all the liquid may be forced from the tank, to avoid contamination of a new mixture from mixtures previously in the tank. The tank is provided with a readily openable filling opening, through which the agitating and mixing operation may readily be observed and which may be closed when desired to produce building up of pressure within the tank.

The accompanying drawings illustrate my invention:

Fig. 1 is a front elevation, in partial vertical section, of an apparatus embodying my invention;

Fig. 2 is a plan of the apparatus shown in Fig. 1, with some parts broken away;

Fig. 3 is a diagrammatic view of one arrangement of valves and control mechanisms, especially suitable when the driving motor is an internal combustion engine as shown in Figs. 1 and 2; and Fig. 4 is a diagrammatic view showing another arrangement of valves, circuits, and control mechanisms, especially suitable when the driving motor is an electric motor.

An agitation and mixing tank 10, shown as cylindrical with curved pressure-sustaining ends, is desirably suitably mounted on a carrying axle 11 having a pair of carrying wheels 12 by which it can readily be moved from place to place; and has an additional support-leg 13 for providing a third point of support when the apparatus is at rest. Conveniently the tank 10 has an operating handle 14, for moving it on the wheels 12.

Desirably mounted on top of the tank 10 is an air-compressor 20, shown as of the vertical reciprocating type. The air-compressor takes in air from the atmosphere, and discharges it through an outlet pipe 21 and a check-valve 22 into a main air-supply pipe 23 leading down into the tank 10 at about its mid-point. The air-supply pipe 23 extends down into the tank 10, desirably to a little below its mid-height, and at its lower end divides into a plurality of smaller constricted-end air-distributing pipes 24, 25, 26; which distribute the air to and discharge it under pressure at various points near the bottom of the tank, to produce effective agitation and mixing of the tank contents. In the preferred arrangement, the middle air-distributing pipe 26 extends straight down nearly to the bottom of the tank, so that the air it discharges downwardly under pressure will spread out in all directions sideways and produce agitation and mixing of the material there. The other two air-distributing pipes 24 and 25 discharge air under pressure in opposite directions, through their restricted ends, toward the two ends of the tank and close to the bottom thereof, to move liquid along the bottom of the tank and up the ends of the tank and thus to produce agitation and promote intimate and thorough mixing of the material in the tank.

At the bottom near one end of the mixing tank 10 is a discharge pipe 30; which supplies the mixed liquid through a hose 31 to a spray nozzle 32, and which is desirably provided with a manual control-valve 33 and with a valved drain-pipe 34 for draining the contents of the tank when desired. Desirably directly over the mixture-discharge pipe 30 is a filling opening 35, through which the operator supplies the ingredients (paint, disinfectant, insecticide, etc.), is able both to observe the agitating and mixing operation, and may insert a hose or other device for cleaning the mixing tank 10 when desired. The filling opening 35 is desirably longer in one direction than in the other, as by being oval in shape, to permit the insertion and removal of a correspondingly oval closure plate 36 normally held tight against the inner end of the filling opening 35 by a wing-nut 37 operating on a spanner bar 38 to pull the threaded stem 39 of the closure plate 36 upward in known manner.

Also suitably mounted on top of the tank 10, conveniently near one end, is a fitting 45 provided with a pressure gage 46, and with a valved opening through which compressed air from the tank may be supplied to an air-hose 47.

The outlet pipe 21 from the air compressor is desirably provided with a loop 48, which serves both to reduce vibration and to provide additional capacity in that outlet pipe.

The air-compressor is operated by a suitable source of power, also conveniently mounted on top of the mixing tank 10. That source of power is shown as an internal combustion engine 51 in Figs. 1, 2, and 3; and as an electric motor 52 in Fig. 4.

The operation of the system is controlled in response to the air pressure in the mixing tank. To that end, a pressure pipe 55, shown as extending upward from a fitting in the outlet pipe 21 between the check-valve 22 and the mixing tank 10 so that it carries the tank-pressure at all times, extends to a suitable pressure-responsive device, such as a diaphragm 56. That diaphragm flexes under variations in the tank pressure to effect the desired control.

When the source of power is the internal combustion engine 51, of Figs. 1, 2, and 3, the diaphragm 56 conveniently acts to hold open the intake valve 57 of the air-compressor 20 when the tank-pressure rises to a predetermined maximum. By this holding open of the intake valve 57, the air-compressor 20 ceases to compress air, and it and its driving engine idle without load. When the pressure in the mixing tank 10 drops to a predetermined lower value, the diaphragm 56 flexes in the other direction, and releases the intake valve 57 for normal operation as an intake valve; whereupon the air-compressor 20 resumes its air-compressing operation. With this arrangement, the device as a whole may be moved from place to place on its supporting wheels 12 without stopping the engine or the air-compressor; and it may be so moved even when the liquid from the tank is being discharged through the spray-nozzle 32.

When the source of power is the electric motor 52, of Fig. 4, the diaphragm 56 exerts a double control—on an electric switch 61 in the circuit of the electric motor, and on a relief valve 62 for the outlet pipe 21; to open both the switch 61 and the relief valve 62 when the tank pressure rises to the predetermined maximum value, and to permit the closing of both the switch and the relief valve when the pressure falls to a predetermined lower value. In the arrangement shown in Fig. 4, the diaphragm 56 acts on a bell-crank 63 biased against the diaphragm, as by an adjustable spring 64. The bell-crank is desirably provided with a spring-catch 65 for holding it in either extreme position in which it happens to be until the total force acting on it is sufficient to move it to the other position against that holding action; whereupon that bell-crank snaps to that other position.

When the tank-pressure rises, and the diaphragm 56 moves the bell-crank 63 to open position, the electric motor 52 and the air-compressor 20 stop, and the air pressure in the outlet pipe 21 between the air-compressor and the check-valve 22 is released. When the tank-pressure drops sufficiently, the spring 64 moves the bell-crank to closed position, to close both the switch 61 and the relief valve 62; whereupon the electric motor 52 starts again, to operate the air-compressor 20, and does so easily because of the unloading produced by the opening of the relief valve.

In operation, the material or materials for the desired liquid to be sprayed are put into the tank 10 through the filling opening 35, either with or without having the air-compressor operating; for the open filling opening prevents production of pressure in the mixing tank. Then the air-compressor is started into operation (if it is not already in operation) with the filling opening 35 still open. Under these conditions the air-compressor discharges air under pressure through the outlet pipe 21, the main distributing pipe 23, and the smaller distributing pipes 24, 25, and 26, to agitate and thoroughly mix whatever is in the tank 10. The agitation and mixing may be watched through the filling opening 35. When sufficient agitation and mixing has been done, the filling opening 35 is closed by the closing plate 36 and the wing-nut 37.

As the air-compressor now continues to operate, it continues to agitate and mix the material in the tank 10; but it also builds up pressure in the tank above the liquid therein. When that pressure reaches the desired maximum value it causes the diaphragm 56 to operate— to hold open the intake valve of the compressor in Figs. 1, 2, and 3, and to stop the electric motor 52 and open the relief valve 62 in Fig. 4. Whenever the pressure in the tank is sufficiently high, whether or not the air-compressor is discharging air into the tank, the liquid may be withdrawn through the spray nozzle 32. As the tank pressure drops, by reason of that withdrawal or for other reasons, the diaphragm 56 flexes the other way, to cause the air-compressor to resume operation; by causing its intake valve to resume normal operation in Figs. 1, 2, and 3, or by closing the motor switch 61 and the unloading valve 62 in Fig. 4.

This operating cycle is repeated as often as required, and the pressure in the tank is maintained within predetermined limits.

The apparatus may be moved from place to place as desired, with or without stopping the spraying operation or the air-compressor or its action.

When the desired spraying has been completed, the air-compressor is stopped, by stopping its engine 51 or its electric motor 52.

Air under pressure may be obtained as desired through the air hose 47; which may also be used to discharge air pressure from the tank when desired.

When it is desired to change liquids, the liquid remaining in the tank may be drawn off through the drain pipe 34. Substantially complete emptying of the tank may be obtained, because of the location of the drain pipe near one end of the mixing tank and of having the inner end of the drain pipe substantially flush with the inner surface of the tank. If it is desired to scrub out the tank after such emptying, a hose may be inserted through the filling opening 35, and a thorough washing of the tank and a thorough flushing out of any material adhering to its inner surface thus obtained.

I claim as my invention:

1. An apparatus for preparing and spraying liquids, comprising a tank having a closable filling opening near one end, an air-supply pipe extending into said tank to supply air thereto, said pipe having a plurality of air-discharge tubes mounted on the bottom thereof for directing streams of air along and toward the bottom of the tank to agitate the contents of said tank, a liquid-discharge outlet at the bottom of said tank below said filling opening and having valve means for selectively discharging the liquid in the tank to a drain and to a hose connection feeding a spring nozzle, a compressor-motor unit mounted on said tank and connected to the air-supply pipe for supplying air under pressure to the tank, a pair of wheels mounted below the tank adjacent its longitudinal center, and a support-leg mounted on the underside of the tank at the end opposite the liquid-discharge outlet, said support-leg in combination with said wheels supporting the tank in a normal level position and permitting said tank to be tilted on said wheels in the direction of the liquid-discharge outlet for draining the contents of the tank.

2. An apparatus as set forth in claim 1 with the addition that said air-supply pipe extends downwardly into said tank at substantially the longitudinal center thereof, and the outlet ends of said air-discharge tubes are disposed adjacent the bottom of said tank to discharge a plurality of air streams along and toward the bottom of the tank in the central portion thereof.

3. An apparatus as set forth in claim 2 with the addition that said air-discharge tubes include one pipe which discharges straight down against the tank bottom and two other pipes located respectively on opposite sides of the first pipe and discharge substantially oppositely along the bottom of the tank.

References Cited in the file of this patent

UNITED STATES PATENTS

| | | |
|---|---|---|
| 1,194,358 | Cecil | Aug. 15, 1916 |
| 1,437,331 | Alexander | Nov. 28, 1922 |
| 1,509,222 | Bayne | Sept. 23, 1924 |
| 1,764,545 | Brown | June 17, 1930 |
| 2,347,267 | Jowers | Apr. 25, 1944 |
| 2,720,342 | Fleck | Oct. 11, 1955 |